United States Patent [19]
Frazier

[11] 3,966,434
[45] June 29, 1976

[54] METHOD FOR FILTERING GAS AND CLEANING OF FILTER BAGS

[75] Inventor: Arthur E. Frazier, Elmore, Ohio

[73] Assignee: Phillips Petroleum Company, Bartlesville, Okla.

[22] Filed: Oct. 21, 1974

[21] Appl. No.: 516,480

[52] U.S. Cl. .................................. 55/96; 55/97; 55/302; 55/341 NT; 55/378; 55/528
[51] Int. Cl.² .................................. B01D 46/04
[58] Field of Search ............... 55/96, 97, 288, 302, 55/341, 378, 528

[56] References Cited
UNITED STATES PATENTS

| | | | |
|---|---|---|---|
| 1,508,367 | 9/1924 | Matlock | 55/96 |
| 2,276,805 | 3/1942 | Tolman, Jr. | 55/288 |
| 3,057,137 | 10/1962 | Perlis et al. | 55/303 |
| 3,520,109 | 7/1970 | Caskey | 55/97 |

OTHER PUBLICATIONS
Teflon Fiber — by Du Pont In Chem. Engr. 5/5/69.

*Primary Examiner*—Bernard Nozick

[57] ABSTRACT

A process for removing solids from a stream of gas comprising passing a solids-laden gas through a woven fabric filter bag, which bag is installed with longitudinal slack, wherein, during filtration, the differential pressure across the bag causes the bag to expand outwardly. During clean-off, the exhaust valve of the apparatus is closed and, as the differential pressure across the bag approaches zero, the bag becomes slack and the solids deposited on the filter surface disengage therefrom and drop, by gravity flow, to a collection bin. The exhaust valve is then opened and the step of removing solids from the gas stream is resumed.

2 Claims, 1 Drawing Figure

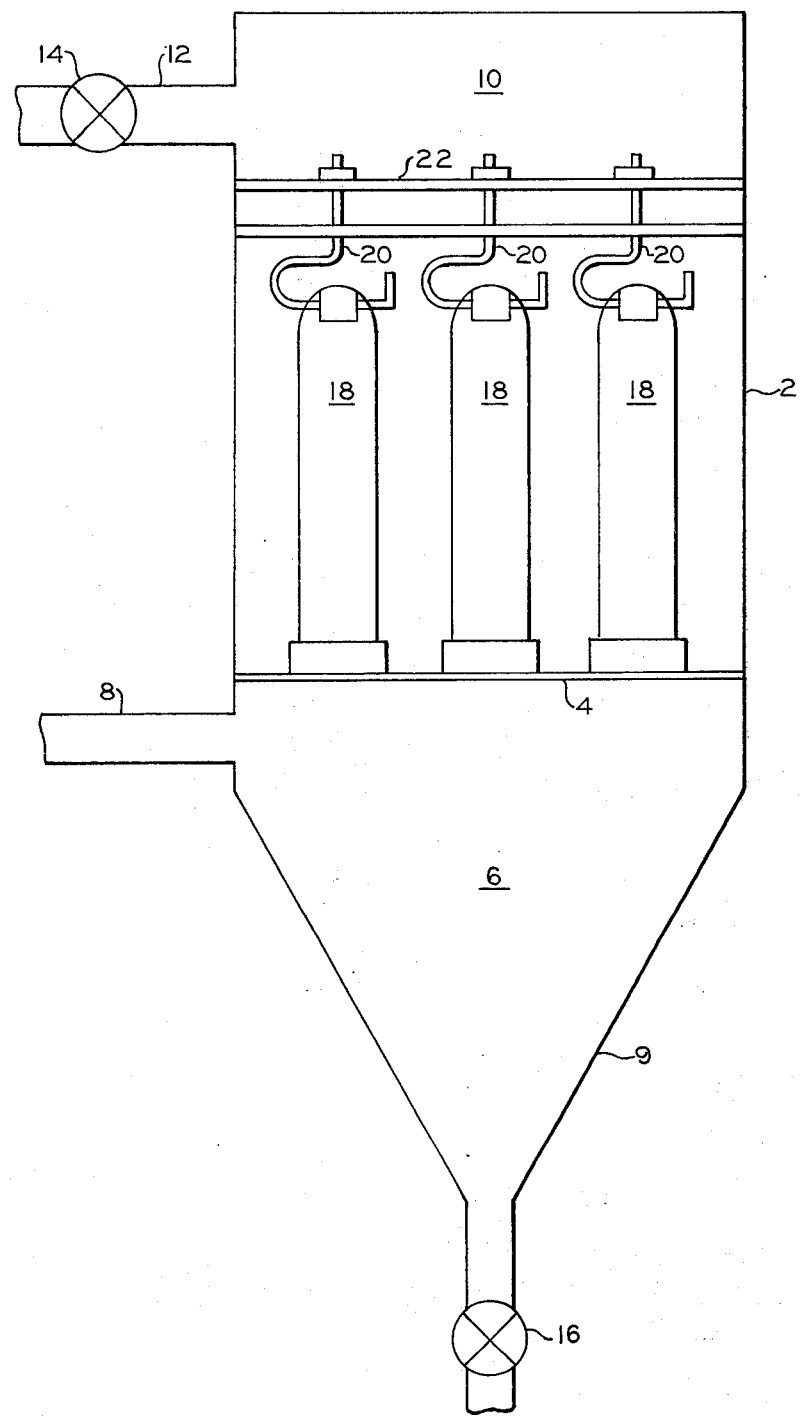

METHOD FOR FILTERING GAS AND CLEANING OF FILTER BAGS

This invention relates to a filtering process.

In many industries there exists the problem of removing suspended solids from a stream of gas which is to be vented to the atmosphere. In some instances it is desirable, from an economic standpoint, to recover the solids. In other instances it is desirable, particularly in congested populated areas, to remove the solids from the vented gases to avoid atmospheric pollution. Various designs of different types of filtering equipment have been developed and are in use at the present time. One type of filtering apparatus used is that commonly called the "bag filter".

A typical bag filter apparatus as for example, in a carbon black plant, comprises a housing which is divided into two compartments by an apertured plate. One of the compartments serves as the inlet which receives carbon black smoke coming from a carbon black furnace. This compartment also serves as the collection bin for filtered carbon black particles. The second compartment serves as the outlet through which the filtered gas is withdrawn from the filtering apparatus. The filter bags are attached at one end to the apertured plate and are suspended by suitable suspending means at the other end, in the outlet compartment, under a longitudinal tension of 5–10 lbs.

During operation of the filtering apparatus, the carbon black smoke enters the first chamber and passes into the bag filters. There, the carbon black particles are restrained by the bag fabric and the carrier gas passes through the bag into the outlet chamber, thence through the outlet conduit. After a suitable filtering period, valves on the inlet and outlet conduits are closed and a gas is passed in the backflow direction to collapse or at least partially collapse the filter bag to remove the carbon black particles deposited thereon. The backflow gas is stopped, the inlet and outlet valves are opened and the filtering apparatus is again placed on filtering duty. The backflow or repressuring system adds to the cost of the filter unit and operation of such system adds to the cost of operation. It is therefore desirable to omit such repressuring system from a bag filter unit. This can be accomplished by installing bag shakers in the unit. However, this again adds to the initial cost and the cost of operation. It is therefore more desirable to omit not only the repressuring system but bag shakers as well.

It is an object of this invention to provide a novel process for filtering particulate solids from a solids-laden gas stream.

It is another object of this invention to provide a process for filtering particulate solids from a solids-laden gas stream using filter bags fabricated from polytetrafluoroethylene.

Other objects, aspects and advantages of this invention will be readily apparent to those skilled in the art from the reading of the following disclosure, claims and drawing which is an elevational view with parts in section of a solids filtering apparatus embodying the present invention.

In accordance with the present invention it has been discovered that by installing the filter bags with slack in the longitudinal direction a bag filter apparatus can be operated without requiring backflow gas or shakers to clean the collected solids from the filter fabric. During filtration, the differential pressure across the bag removes the slack by causing the bag to expand outwardly. During clean-off, the exhaust valve is closed and as the differential pressure across the bag approaches zero, the bag becomes slack and the solids deposited on the filter surface disengage therefrom and fall into a collection chamber below the bag. The exhaust valve is then opened and the step of removing solids from the gas stream is resumed.

More specifically it has now been discovered that cleaning of the collection surface of filter bags utilized in a filtering system to remove particulate solids from a solids-laden gas stream is readily achieved solely through variation of the differential pressure across the bag if the bag is initially installed in such a manner as to have longitudinal slack therein prior to the initial pressuring of the system.

Thus when operating a filter system according to the instant invention there is avoided the repressuring system and/or shaker system ordinarily required in the normal operation of bag filters.

The filter bags employed according to the process of the present invention must be heat stable, exhibiting minimal shrinkage. It is presently preferred that such filter bags exhibit a shrinkage of less than about 0.1 percent. Heat stabilization of the filter bags can be achieved in any suitable manner, such as by preshrinking the bag fabric and/or preshrinking the fabricated bag. Such bags are fabricated by conventional methods known in the art.

The present invention is particularly adapted to a process employing filter bags fabricated from polytetrafluoroethylene woven fabric. Such fabric is commercially available. A typical polytetrafluoroethylene fabric has a weave design of 3 × 1 twill, weighs 8 oz. per square yard, is about 0.01 inches thick, has a thread count of 75 ends per inch in the warp and 62 picks per inch in the filling and has a porosity of 20 to 40 cfm per square foot at a pressure of 0.5 inches of water.

According to the process of this invention, a pretreated or heat-stable filter bag is installed in a bag filter apparatus with from 0.5 to 5 percent slack in the longitudinal direction, based upon the length of the bag. During filtration, the differential pressure across the bag causes the bag to expand radially and longitudinally outward. During clean-off, the exhaust valve is closed and as the differential pressure across the bag approaches zero, the bag becomes slack and the solids deposited on the filter surface disengage therefrom. The solids which disengage from the filter surface fall, by gravity flow, into a collection bin and are transported from the bin to further processing. The exhaust valve is then opened and the step of removing solids from the gas stream is resumed.

In the accompanying drawing is shown a solids filtering apparatus comprising a housing 2 which is divided into two compartments by apertured plate 4. The lower compartment, generally designated 6, receives the solids-laden gas stream through inlet conduit 8. This compartment also serves as the collection bin for filtered solid particles, the collection bin being designated 9. The upper compartment, generally designated 10, serves as the outlet through which the filtered gas is withdrawn from the filtering apparatus and passed to outlet conduit 12, equipped with outlet valve 14. The collection bin 9 is provided with a valve 16 which acts as an air lock, allowing withdrawal of the filtered particles from the compartment 6 without loss of the solids-laden gas.

The filter bags 18 are attached at one end to the apertured plate 4 and are suspended by suspending hooks 20 which are supported by beam 22.

As discussed above, the filter bags 18 are installed with from 0.5 to 5 percent longitudinal slack, based on bag length. During filtration, valve 14 is open, the solids-laden gas enters the filtering apparatus via conduit 8, passes upward through bags 18 and the cleaned gas exits the apparatus via conduit 12 and valve 14. During filtration, the differential pressure across the bags 18 causes the bags to expand. For clean-off, the outlet valve 14 is closed thereby causing the differential pressure across the bag to approach zero. Due to drop in pressure the bag becomes slack and the particles deposited on the filter surface disengage therefrom and fall, by gravity flow, into collection bin 9. After a predetermined period, exhaust valve 14 is opened and the filtration of particles from a solids-laden gas is resumed.

It can be seen that the process of the present invention obviates the need for inlet and backpressuring valves and their associated plumbing or for bag shakers.

The process of this invention is particularly adapted for the filtering of carbon black particles from a carbon black smoke.

Reasonable variations and modifications, which will be apparent to those skilled in the art, can be made in this invention without departing from the spirit and scope thereof.

What is claimed is:

1. A process for removing suspended solids from a stream of gas comprising passing a solids-laden gas stream through a filter bag in a bag filter compartment, wherein said bag is fabricated from a polytetrafluoroethylene woven fabric wherein said bag is heat-stabilized, and wherein said filter bag is mounted in said filter compartment with 0.5 to 5 percent longitudinal slack, based upon the bag length when there is no differential pressure across said bag and wherein during filtration the differential pressure across said bag removes said slack by causing said bag to expand, collecting clean gas in a closed compartment enclosing said filter bag, exhausting said clean gas via an open exhaust valve, closing said exhaust valve whereby when said exhaust valve is closed, the differential pressure across said bag approaches zero, said bag becomes slack and the solids deposited on the filter surface disengage therefrom and fall to collection chamber, after which, said exhaust valve is opened and the step of removing solids from said stream of gas is resumed.

2. The process of claim 1 wherein said solids-laden stream is a carbon-black smoke.

* * * * *